United States Patent
Lamperth

(10) Patent No.: US 9,254,740 B2
(45) Date of Patent: Feb. 9, 2016

(54) DRIVETRAIN FOR A HYBRID ELECTRIC VEHICLE

(75) Inventor: Michael Ulrich Lamperth, Woking (GB)

(73) Assignee: EVO Electric, Ltd., London (GB)

(*) Notice: Subject to any disclaimer, the term of this patent is extended or adjusted under 35 U.S.C. 154(b) by 617 days.

(21) Appl. No.: 12/741,877

(22) PCT Filed: Nov. 10, 2008

(86) PCT No.: PCT/GB2008/003776
§ 371 (c)(1),
(2), (4) Date: Sep. 13, 2010

(87) PCT Pub. No.: WO2009/060222
PCT Pub. Date: May 14, 2009

(65) Prior Publication Data
US 2010/0326752 A1    Dec. 30, 2010

(30) Foreign Application Priority Data
Nov. 8, 2007  (GB) .................................. 0721929.8

(51) Int. Cl.
*B60K 6/442* (2007.10)
*B60K 6/387* (2007.10)

(52) U.S. Cl.
CPC ............... *B60K 6/442* (2013.01); *B60K 6/387* (2013.01); *B60Y 2400/607* (2013.01); *Y02T 10/6234* (2013.01)

(58) Field of Classification Search
USPC ............................................ 180/65.1–65.29
See application file for complete search history.

(56) References Cited

U.S. PATENT DOCUMENTS

| | | | | |
|---|---|---|---|---|
| 6,762,523 B1 * | 7/2004 | Lisowski | ........................ | 310/103 |
| 6,886,648 B1 * | 5/2005 | Hata et al. | ................ | 180/65.235 |
| 7,306,064 B2 * | 12/2007 | Imazu et al. | ............. | 180/65.285 |

(Continued)

FOREIGN PATENT DOCUMENTS

| | | |
|---|---|---|
| JP | 2001298804 | 10/2001 |
| JP | 2004007944 | 1/2004 |

(Continued)

OTHER PUBLICATIONS

International Search Report and Written Opinion dated Feb. 26, 2009.
GB Examiner Communication dated Mar. 2, 2009.

*Primary Examiner* — Jeffrey J Restifo
*Assistant Examiner* — Erez Gurari
(74) *Attorney, Agent, or Firm* — Pepper Hamilton LLP

(57) ABSTRACT

A drivetrain for a hybrid-electric vehicle (200), including an engine (210), a first electrical machine (220), a second electrical machine (230), and at least one driveshaft (260). The first (220) and second (230) electrical machines are axial-flux electrical machines. The first electrical machine (220) is arranged to be driven by the engine (210) so as to operate as a generator and to supply electrical power for the second electrical machine (230). The second electrical machine (230) is arranged to receive electrical power so as to operate as a motor and to drive the at least one driveshaft (260). The drivetrain includes a clutch (225) selectively operable to provide inter-engagement between the rotor of the first electrical machine (220) and the rotor of the second electrical machine (230) to transmit rotary power therebetween.

19 Claims, 2 Drawing Sheets

SERIES HYBRID SYSTEM LAYOUT

(56) References Cited

U.S. PATENT DOCUMENTS

| | | | |
|---|---|---|---|
| 7,315,090 B2 * | 1/2008 | Yang | 290/40 C |
| 7,806,795 B2 * | 10/2010 | Oba et al. | 475/5 |
| 7,992,661 B2 * | 8/2011 | Nomura et al. | 180/65.21 |
| 8,028,778 B2 * | 10/2011 | Luo et al. | 180/65.22 |
| 8,091,659 B2 * | 1/2012 | Luo et al. | 180/65.22 |
| 8,135,522 B2 * | 3/2012 | Tabata et al. | 701/66 |
| 2003/0106729 A1 * | 6/2003 | Noreikat et al. | 180/65.7 |
| 2007/0007059 A1 * | 1/2007 | Nomura et al. | 180/65.2 |
| 2008/0149407 A1 * | 6/2008 | Shibata et al. | 180/65.2 |
| 2010/0326752 A1 * | 12/2010 | Lamperth | 180/65.245 |

FOREIGN PATENT DOCUMENTS

| | | |
|---|---|---|
| JP | 2004352042 | 12/2004 |
| JP | 2006044649 | 2/2006 |
| JP | 2007015441 | 1/2007 |
| JP | 2007099016 | 4/2007 |
| JP | 2007168551 | 7/2007 |
| WO | 99/21263 A2 | 4/1999 |
| WO | 2007/017719 A2 | 2/2007 |
| WO | 2008/016417 A2 | 2/2008 |

* cited by examiner

SERIES HYBRID SYSTEM LAYOUT

PARALLEL HYBRID SYSTEM LAYOUT

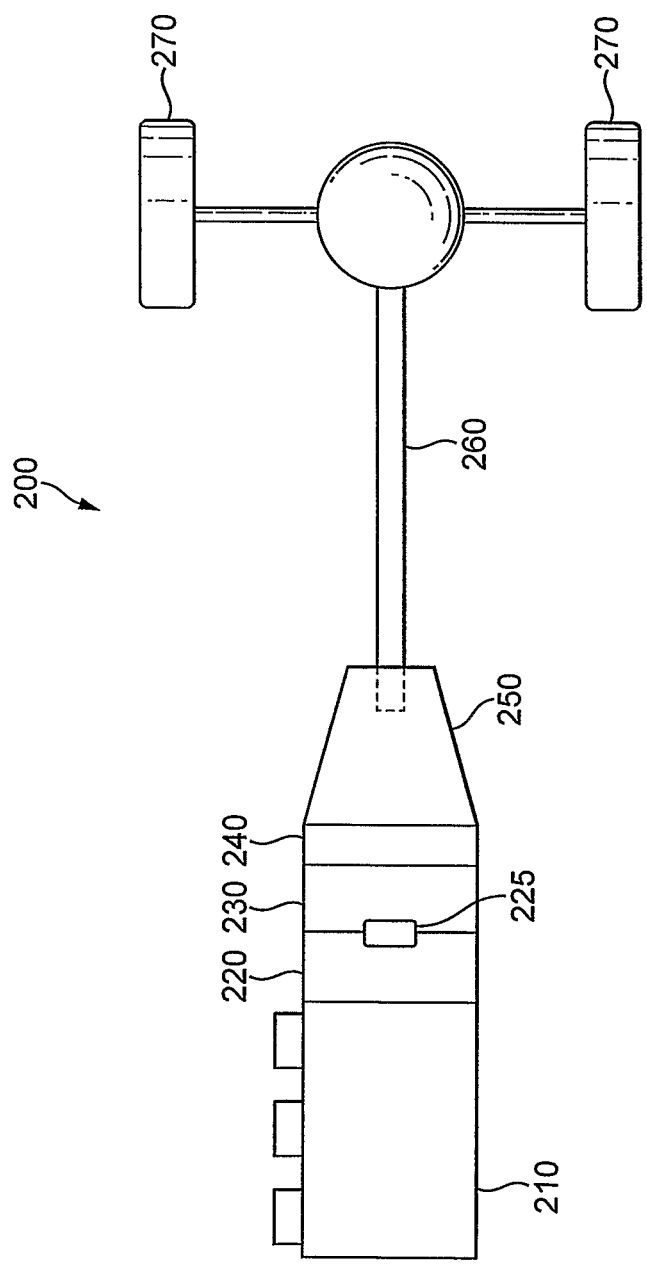

DRIVETRAIN FOR A HYBRID ELECTRIC VEHICLE

CROSS-REFERENCE TO RELATED APPLICATIONS

This application is the U.S. National Stage filing of International Application Serial No. PCT/GB2008/003776 filed Nov. 10, 2008, which claims priority to GB Application No. 0721929.8 filed Nov. 8, 2007, each of which is herein incorporated by reference in its entirety.

TECHNICAL FIELD

This invention relates to a drivetrain for a hybrid electric vehicle.

BACKGROUND

Hybrid electric vehicles that include both an internal combustion engine and an electrical machine operable as a motor to at least assist in driving the wheels of the vehicle are becoming more popular. This is at least in part due to their perceived greater fuel efficiency. The drivetrains in such vehicles, that is the collection of components through which power is conveyed to drive the vehicle, can be arranged in several layouts. Examples of two existing types of drivetrain layout used in hybrid electric vehicles are series drivetrain layouts and parallel drivetrain layouts.

FIG. 1 shows a series drivetrain layout 10 in simplified diagrammatic form. With reference to FIG. 1, an engine 20 is mechanically coupled to a first electrical machine 30 to rotate the rotor of that machine so as to allow that machine 30 to be operated as a generator. The first electrical machine 30 is electrically coupled to a second electrical machine 40 so as to allow that second electrical machine 40 to be operated as a motor. The second electrical machine is mechanically coupled to a transmission 50 such that the rotor of that machine drives the transmission 50. The transmission 50 is mechanically coupled to wheels 60 so as to drive those wheels 60. The series layout 10 further includes a battery 70 that is arranged to store excess electrical energy when the power output of the first electrical machine 30 exceeds the power consumption of the second electrical machine 40, and to supply stored electrical energy when the power output of the first electrical machine 30 is lower than the desired power consumption of the second electrical machine 40. The battery 70 may also store electrical energy generated by the second electrical machine 40 when that machine is operated as a motor in regenerative braking.

FIG. 2 shows a parallel drivetrain layout 100 in simplified diagrammatic form. With reference to FIG. 2, an engine 120 is mechanically coupled through a first clutch 130 and then a driveshaft 135 to transmission 140. The transmission 140 is mechanically coupled to wheels 150. The drive shaft 135 is also mechanically coupled to a second clutch 160, which is in turn mechanically coupled to an electrical machine 170 operable as a motor/generator. The motor/generator 170 is connected to a battery 180 so as to charge the battery 180 when operating as a generator and discharge the battery 180 when operating as a motor. The two clutches 130, 160 can be selectively engaged and disengaged such that:
(a) the engine 120 drives the wheels 150 and drives the motor/generator 170 as a generator to charge the battery 180;
(b) both the engine 120 and the motor/generator 170 drive the wheels 150, with the motor/generator 170 operating as a motor and discharging the battery 180
(c) the motor/generator 170 only is coupled to the wheels 150 and drives the wheels 150, again operating as a motor; and
(d) the motor/generator 170 only is coupled to the wheels 150 and is driven by the wheels to operate as a generator in regenerative braking.

Whilst a hybrid electric vehicle incorporating a series drivetrain layout may give improved efficiency in some operating conditions, it is also likely to be under-powered. This is because power to the wheels is provided by the motor and so vehicle performance is limited by the power output of that motor.

By contrast, in a hybrid electric vehicle with a parallel drivetrain layout, the motor/generator can be operated as a motor to assist the engine in driving the wheels, thereby increasing power to the wheels and the vehicle's performance. This arrangement, however, tends to be less efficient in some operating conditions.

It is therefore an object of this invention to provide a new driveline layout which seeks to maintain some of these advantages whilst addressing some of these drawbacks.

SUMMARY

According to one aspect of this invention there is provided a drivetrain for a hybrid-electric vehicle, the drivetrain including an engine, a first electrical machine, a second electrical machine, and at least one driveshaft; wherein the first and second electrical machines are axial-flux electrical machines, the first electrical machine is arranged to be driven by the engine so as to operate as a generator and to supply electrical power for the second electrical machine, the second electrical machine is arranged to receive electrical power so as to operate as a motor and to drive the at least one driveshaft; and wherein the drivetrain includes inter-engaging means selectively operable to provide inter-engagement between the rotor of the first electrical machine and the rotor of the second electrical machine to transmit rotary power therebetween.

By operating the inter-engaging means to provide substantially no inter-engagement between the rotors of the first and second electrical machines, the drivetrain can be operated as a series hybrid drivetrain. By operating the inter-engaging means to provide inter-engagement between the rotors of the first and second electrical machines, direct, substantially mechanical, drive from the engine to the wheels can be achieved. Thus, the drivetrain can be operated as a parallel hybrid drivetrain. Accordingly, it is possible to operate the drivetrain as a series hybrid drivetrain in conditions to which a series hybrid drivetrain is well suited, and to operate the drivetrain as a parallel hybrid drivetrain in conditions to which a parallel hybrid drivetrain is well suited.

For example, in urban driving, where it is desirable for a vehicle in which the drivetrain is incorporated to operate over a range of speeds, with frequent stopping and starting, operating the drivetrain as a series hybrid drivetrain is advantageous in allowing the engine to be operated at, or close to, its most efficient speed and power, regardless of the speed of the vehicle. This is possible because the electrical link between the first and second electrical machines, and the lack of any inter-engagement between the rotors thereof allows, effectively decouples the wheels from the engine.

However, in motorway (or "highway" in US English) driving for example where high, constant, speeds are common, operating the drivetrain like a parallel hybrid drivetrain can be advantageous: operating the inter-engaging means to provide inter-engagement between the rotors of the electrical machines provides a direct, substantially mechanical, link between the engine and the wheels such that conversion from mechanical energy to electrical energy and then back to mechanical energy can be avoided and the associated losses in efficiency also avoided. Furthermore, since the engine generally operates with a more constant speed and power in motorway driving, coupling of the engine to the wheels does not tend to result in great inefficiencies. In addition, one or both of the electrical machines can be operated as motors to assist the engine in driving the wheels.

It has been found that axial-flux electrical machines are particularly advantageous as they can be operated efficiently at speeds similar to the efficient operating speed of an internal combustion engine. Thus, they can be used efficiently without the need for a gearbox to connect them to the engine. In at least certain embodiments therefore the first electrical machine may be coupled to the engine without a gearbox therebetween. The second electrical machine may also be coupled to the engine without a gearbox therebetween. By omitting a gearbox between the engine and the first and/or second electrical machines frictional losses in the drivetrain are lower than they otherwise would be, it being understood that the friction between components of a gearbox leads to losses. Thus, efficiency of the drivetrain, and hence the fuel efficiency of the hybrid-electric vehicle, is improved.

The second electrical machine may be coupled to the at least one driveshaft without a gearbox therebetween. Thus, efficiency of the drivetrain, and hence of the hybrid-electric vehicle is further improved.

Furthermore, it has been found that the axial-flux machines, because of their short axial-length can occupy space in a vehicle that otherwise would have been occupied by a gearbox. Thus, axial-flux machines result in convenient packaging of the driveline components.

The inter-engaging means may be a mechanical linkage that is selectively operable to provide a mechanical link between the two rotors. The inter-engaging means may be selectively operable to provide an electromagnetic link between the two rotors. The inter-engaging means may be such that it couples one rotor to the other. The inter-engaging means may be a clutch. The clutch may be of the type that relies on friction to transmit rotary power. The clutch may be of the type that relies on electromagnetism to transmit rotary power. The clutch may be a conventional friction clutch. The clutch may be an electromagnetic clutch. The inter-engaging means may be a decoupleable mechanical link such as that used in gearboxes.

The drivetrain may include electrical energy storage means arranged to store electrical energy generated by the first electrical machine and to supply stored electrical energy to the second electrical machine for operation as a motor. The electrical energy storage means may include one or more storage means that is arranged to convert electrical energy to chemical energy for storage. The storage means may include one or more batteries. The electrical energy storage means may include one or more capacitative storage devices, such as capacitors. The capacitors may include ultra-capacitors.

The rotor of the first electrical machine may be coupled to a crankshaft of the engine. The rotor of the second electrical machine may be coupled to the input shaft of a gearbox, the output shaft of the gearbox being coupled to the at least one driveshaft. A clutch may be provided between the rotor of the second electrical machine and the input shaft of the gear box. The drivetrain may also include a flywheel.

The engine may be an internal combustion engine. The engine may be a petrol engine. The engine may be a diesel engine.

According to second aspect of this invention, there is provided a motor-generator arrangement for the drivetrain of a hybrid electric vehicle, the arrangement including the first and second electrical machines and the inter-engaging means of the first aspect of the invention.

According to a third aspect of this invention, there is provided a vehicle including a drivetrain according to the first aspect of the invention.

According to a fourth aspect of this invention, there is provided a method of operating the drivetrain of the first aspect of this invention.

In one mode of operation, the method may include operating the first electrical machine as a generator and the second electrical machine as a motor to drive the at least one driveshaft, with the inter-engaging means providing substantially no inter-engagement between the two rotors. This mode may correspond to period of urban operation of a vehicle in which the drivetrain is incorporated, that would typically include frequent stopping and starting and driving at varying speed.

In another mode of operation, the method may include operating the inter-engaging means to provide inter-engagement between the two rotors to transmit rotary power therebetween. This mode may correspond to a period of constant speed of the vehicle, such as motorway cruising.

In a further mode of operation, the method may be as in the other mode with the exception that the second electrical machine is operated as a motor to drive the at least one driveshaft. Additionally, the first electrical machine may be operated as a motor. The or each electrical machine may be operated in this mode as motors by drawing stored electrical energy from the electrical energy storage means. The or each electrical machine may be operated in this mode as generators to generate electrical energy for storage in the electrical energy storage means. This mode may correspond to a period of very high load, such as during maximum acceleration.

The method may include operating the inter-engaging means to provide inter-engagement between the two rotors only when the two rotors are rotating with substantially constant speed, or are both at rest. The inter-engagement means may therefore be such that it does not need to provide for slipping between its input and output.

According to a fifth aspect of this invention, there is provided electronic processing apparatus programmed and operable to carry out a method as defined hereinabove.

According to a sixth aspect of this invention, there is provided a computer program having code portions executable by electronic processing apparatus to cause that apparatus to carry out a method as defined hereinabove.

According to a seventh aspect, there is provided a record carrier carrying therein or thereon a record of a program according to the sixth aspect.

The record carrier may be a physical storage medium, such as, for example solid state storage means or magnetic or optical storage means; and may be, for example, flash memory, an EPROM, an EEPROM, a magnetic storage disk or an optical storage disk.

BRIEF DESCRIPTION OF THE DRAWINGS

Specific embodiments of the present invention will now be described by way of example only and with reference to the accompanying drawings, in which:

FIG. 3 is a diagrammatic representation of a drivetrain that embodies the present invention.

SPECIFIC DESCRIPTION OF CERTAIN EMBODIMENTS

Figure 1:
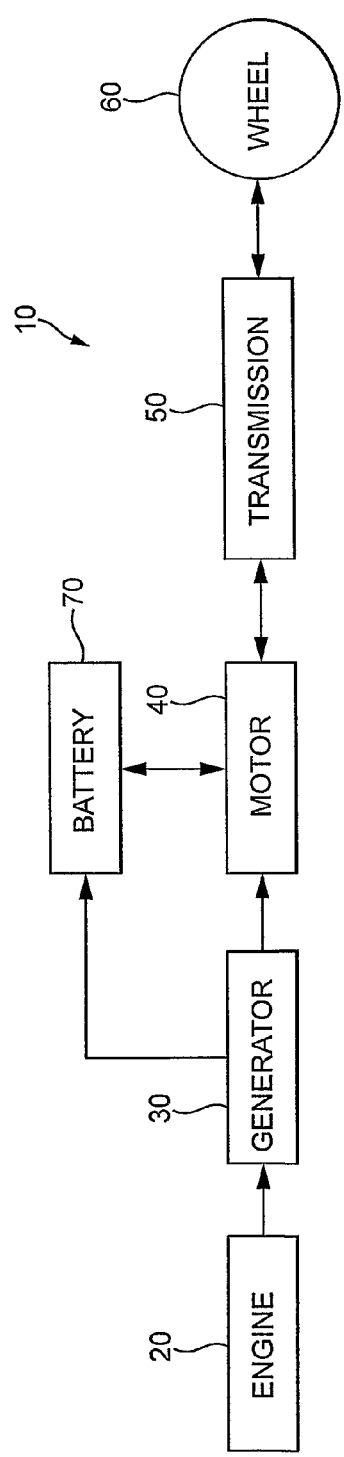
FIG. 1 is a diagrammatic representation of an existing series drivetrain for a hybrid electric vehicle.
Figure 2:
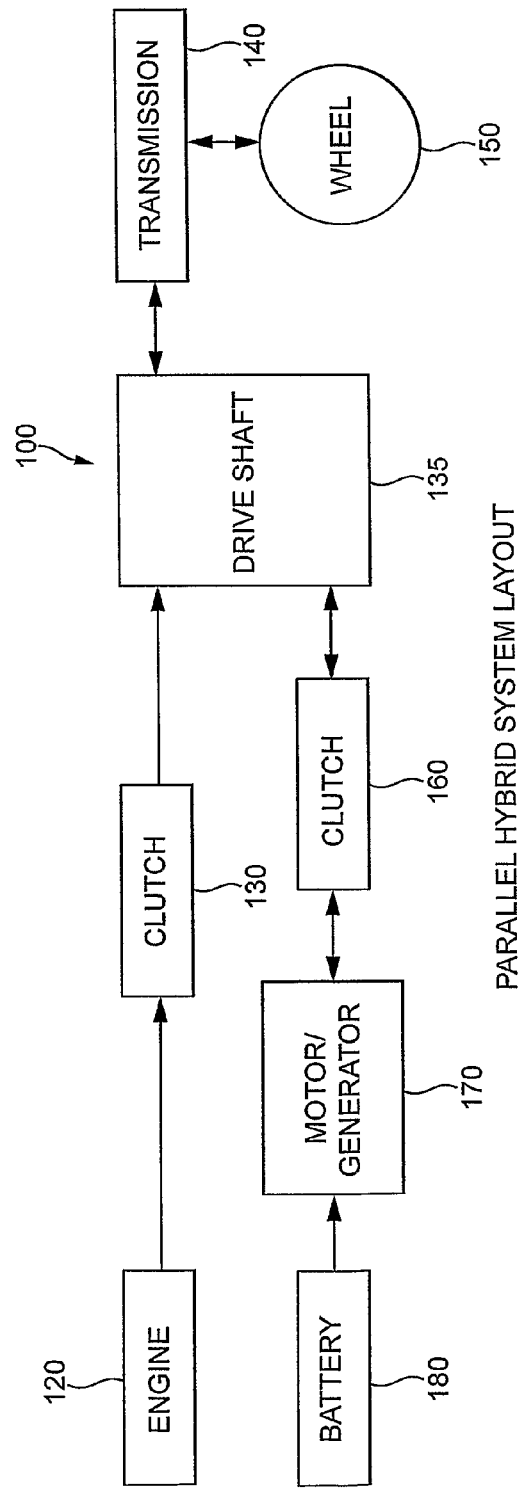
FIG. 2 is a diagrammatic representation of an existing parallel drivetrain for a hybrid electric vehicle.

FIG. 3 shows in schematic form the layout of a drivetrain 200 that embodies this invention. The drivetrain 200 is for a hybrid electric vehicle (not shown). Whilst it is envisaged that the drivetrain may be used in, or adapted for use in, hybrid vehicles of many different sizes and applications, it is envisaged that the vehicle in this embodiment is a van or truck of about 7.5 tonnes. It will be appreciated that such a vehicle is a commercial vehicle of the type often used to perform deliveries of goods.

With continued reference to FIG. 3, the drivetrain 200 includes a diesel engine 210, a first axial-flux electrical machine 220, an inter-engaging means 225, a second axial-flux electrical machine 230, a conventional clutch 240, a conventional gearbox 250, driveshafts 260 and wheels 270.

The first axial-flux electrical machine 220 is mounted to the engine 210, with the rotor of that machine 220 coupled to the crankshaft of the engine 210 for rotation relative to the stator of the machine 220, which is fixed relative to the engine block and the vehicle chassis. The second electrical machine 230 is mounted axially adjacent the first electrical machine 230. The second electrical machine is also mounted with its stator fixed relative to the engine block and the vehicle chassis.

An electrical connection (not shown) is provided between the first electrical machine 220 and the second electrical machine 230 such that the former can be used as a generator to power the latter. It will therefore be understood by the skilled addressee that appropriate power electronics (not shown) will be provided to manage this electrical connection and control operation of the first 220 and second 230 electrical machines. It is envisaged that an electronic control unit (ECU) (not shown) will be provided to control operation of the power electronics in accordance with a method that also embodies this invention. The skilled person is familiar with such power electronics and ECUs. These will therefore not be described. Although not shown in FIG. 3, the drivetrain 200 also includes energy storage means in the form of ultra-capacitors, which are electrically connected to both the first 220 and second 230 electrical machines and controllable charged or discharged thereby under the control of the power electronics and the ECU.

The inter-engaging means 230 is in the form of an electromagnetic clutch 225. This electromagnetic clutch 225 is mounted between the two electrical machines 220, 230. A first rotating part (not shown) of the electromagnetic clutch 225 is mechanically coupled to the rotor of the first electrical machine 220. A second rotating part (not shown) of the electromagnetic clutch 225 is mechanically coupled to the rotor of the second electrical machine 230. The electromagnetic clutch 225 is arranged such that engagement thereof tends to couple the first rotating part thereof to the second rotating part thereof, and hence the rotor of the first electrical machine 220 to the rotor of the second electrical machine 230; and such that disengagement thereof tends to decouple these two parts, and hence the two rotors. Operation of the electromagnetic clutch 225 is controlled by the ECU. An electromagnetic clutch 225 with a short axial length is preferred in order minimised axial separation of the first 220 and second 230 electrical machines, thereby saving space.

The conventional clutch 240 is mounted between the second electrical machine 230 and the conventional gearbox 250, to selectively couple the rotor of the second electrical machine 230 to the input shaft (not shown) of the gearbox 240. In this embodiment the casing of the conventional gearbox 250 is mounted to the stator of the second electrical machine 230 and to the casing of the gearbox 250. In this embodiment the conventional clutch 240 and the gearbox 250 are operated automatically under control of the ECU. It is envisaged, however, that a manual clutch and gearbox may instead be used.

The gearbox 250 is coupled to the driveshafts 260 and the wheels 270 in a conventional manner.

The ECU is operable to execute a computer program to cause the ECU to perform a method of operating the drivetrain that embodies the present invention. The method includes several modes of operation corresponding to different driving conditions of the vehicle. These will now be described.

A first mode of operation can be considered to correspond to normal operation of the vehicle, such as operation in an urban setting. In this mode, the vehicle operates at a range of speeds, with frequent stopping and starting. Very high power output to the wheels 270 is not usually necessary and so very high power output from the second electrical machine 230 is not usually required. In this mode, the first electrical machine 220 operated as a generator and the second electrical machine 230 is operated as a motor, the former providing electrical power to power the latter. The electromagnetic clutch 225 is not engaged in this mode of operation. Thus, there is no inter-engagement between the rotors of the two electrical machines 220, 230 and so the engine 210 is decoupled from the wheels 270.

The first mode of operation is advantageous in that, as the engine is decoupled from the wheels, the engine can be maintained at a speed and power output that are at, or are at least close to, those corresponding to maximum efficiency. The decoupling allows this optimal engine speed and power, and hence the associated efficiency, to be maintained irrespective of the varying speed of the vehicle. Thus, efficiency can be maximised. Whilst the power that can be transferred to the wheels 270 is limited by the power output of the second electrical machine 230, it is anticipated that this should be adequate for operation of the vehicle in this mode.

In the first mode of operation, if the desired power output of the second electrical machine 230 is less than that corresponding to the electrical power available from the first electrical machine 220, excess electrical energy is stored in the ultra-capacitors for later use. Similarly, if the desired power output of the second electrical machine 230 is greater than that corresponding to the electrical power available from the first electrical machine 220, the ultra-capacitors are discharged to make-up the shortfall.

A second mode of operation can be considered as corresponding to periods of medium power demand from the drivetrain and in which the vehicle travels with approximately constant speed. An example of this is operation during motorway ("highway" in American English) cruising. In this mode of operation, the electromagnetic clutch 225 is engaged. As described hereinabove, this results in the rotor of the first electrical machine 220 being coupled to the rotor of the second electrical machine 230, such that each tends to rotate together. In this way, rotary power is transmitted directly from the engine 210 through the rotor of the first electrical machine 210, the electromagnetic clutch 225 and the rotor of the second electrical machine 230 to the conventional clutch 240 and the gearbox 250 for transmission to the wheels 270.

This second mode of operation is therefore advantageous in that the drivetrain does not rely on converting mechanical energy into electrical energy and then back into mechanical energy as is the case in the first mode. Instead, there is a direct, substantially mechanical, link. As conversion of energy is minimised, efficiency is maximised. (It should be noted that in this mode, as the vehicle speed is more constant than in the first mode, there is little loss in efficiency by coupling the engine to the wheels: when coupled to the wheels, the engine runs with something approaching constant speed.)

In the second mode of operation, the first electrical machine 220 may be operated as a generator to charge the ultra-capacitors.

A third mode of operation can be considered to correspond to periods in which maximum power output is required from the drivetrain, or to periods during operation in the second mode when additional power output is required, such as when accelerating during motorway driving to overtake another vehicle. In this mode of operation, the electromagnetic clutch 225 is engaged as in the second mode of operation and the second electrical machine 230 is operated as a motor to assist the engine 210 in driving the wheels 270. It is envisaged that the first electrical machine 220 would not be operated as a generator in this mode of operation and the second electrical machine 230 would be powered by discharging the ultra-capacitors. To provide additional rotary power to the drivetrain the first electrical machine 220 may additionally be operated as a motor, again by discharging the ultra-capacitors.

As already mentioned above, it has been found that axial-flux electrical machines are particularly advantageous for use in drivetrains that embody this invention. This is because they can be operated efficiently at speeds similar to the efficient operating speed of an internal combustion engine. Thus, they can be used efficiently without the need for a gearbox to connect them to the engine. This improves the efficiency of the drivetrain by avoiding losses therefrom that would otherwise result from the use of a gearbox to connect the axial-flux machines 220, 230 to the engine 210.

In an alternative embodiment that is not illustrated, a drivetrain is provided that is as that 200 described above with reference to FIG. 3, but which differs in lacking the gearbox 250 between the second electrical machine 230 and the driveshafts 260.

It has also been found that axial-flux machines, because of their short axial-length, can occupy space in a vehicle that would normally be occupied by the gearbox which they render unnecessary. Thus, axial-flux machines result in convenient packaging of the driveline components described hereinabove.

In the embodiments described above, it is envisaged that the axial-flux electrical machines be of the type that has a single rotor disc rotatably mounted between two toroidal stators. The rotor disc has a plurality of permanent magnets mounted thereon in a circumferentially-distributed series. A stator winding is provided on the stators. An example of such an electrical machine is given in International Application No. PCT/GB2007/002560, the contents of which are hereby incorporated herein by reference. However, it is envisaged that, in other embodiments, other types of axial-flux electrical machine may be used. For example, the second electrical machine by be an induction axial-flux electrical machine in which no permanent magnets are mounted on the rotor.

The invention claimed is:

1. A drivetrain for a hybrid-electric vehicle, the drivetrain comprising:
   an internal combustion engine having a crankshaft;
   a first axial flux electrical machine located axially adjacent the internal combustion engine and having a rotor directly coupled with the crankshaft of the internal combustion engine, the rotor being arranged to be driven by the crankshaft of the internal combustion engine;
   a first clutch mounted axially adjacent the first axial flux electrical machine, wherein the first clutch is mechanically and directly connected to the rotor of the first axial flux electrical machine;
   a second axial flux electrical machine mounted axially adjacent the first clutch and operable to receive electrical power and to operate as a motor, the first clutch thereby being located axially between the first and second axial flux electrical machines, and being selectively operable to provide inter-engagement between the rotor of the first axial flux electrical machine and a rotor of the second axial flux electrical machine;
   a second clutch located axially adjacent the second axial flux electrical machine, wherein the second clutch is mechanically and directly connected to the rotor of the second axial flux electrical machine;
   a gearbox located axially adjacent the second clutch, the second clutch thereby being located axially between the second axial flux electrical machine and the gearbox, and being selectively operable to provide inter-engagement between the rotor of the second axial flux electrical machine and an input driveshaft of the gearbox, the gearbox having an output driveshaft that provides an output driveshaft for transmitting rotary power from the drivetrain;
   wherein the first clutch and the second clutch directly couple the rotor of the first axial flux electrical machine to the rotor of the second axial flux electrical machine;
   wherein respective output shafts of the engine, the first axial flux electrical machine, the first clutch, the second axial flux electrical machine, and the second clutch are substantially coaxial with the input driveshaft of the gearbox; and
   wherein the internal combustion engine, the first axial flux electrical machine, the first clutch, the second axial flux electrical machine, the second clutch, and the gearbox are arranged in a series along a longitudinal axis of the drivetrain.

2. A drivetrain according to claim 1, wherein the inter-engaging means is a mechanical linkage that is selectively operable to provide a mechanical link between the two rotors.

3. A drivetrain according to claim 1, wherein the inter-engaging means is selectively operable to provide an electromagnetic link between the two rotors.

4. A drivetrain according to claim 1, wherein the drivetrain comprises electrical energy storage means arranged to store electrical energy generated by the first electrical machine and to supply stored electrical energy to the second electrical machine for operation as a motor.

5. A drivetrain according to claim 4, wherein the electrical energy storage means comprises one or more storage means that is arranged to convert electrical energy to chemical energy for storage.

6. A drivetrain according to claim 5, wherein the storage means comprises one or more batteries.

7. A drivetrain according to claim 4, wherein the electrical energy storage means comprises one or more capacitative storage devices.

8. A drivetrain according to claim 7, wherein the one or more capacitative storage devices are selected from capacitors and ultra-capacitors.

9. A drivetrain according to claim 1, wherein the first electrical machine is coupled to the engine without a gearbox therebetween.

10. A drivetrain according to claim 1, wherein the second electrical machine is coupled to the at least one driveshaft without a gearbox therebetween.

11. A motor-generator arrangement for the drivetrain of a hybrid electric vehicle, the arrangement comprising the first and second electrical machines and inter-engaging means according to claim 1.

12. A hybrid electric vehicle comprising a drivetrain according to claim 1.

13. A method of operating a drivetrain according to claim 1.

14. A method according to claim 13, wherein, in one more of operation, the method comprises operating the first electrical machine as a generator and the second electrical machine as a motor to drive the at least one driveshaft, with the inter-engaging means providing substantially no inter-engagement between the two rotors.

15. A method according to claim 14, wherein, in another mode of operation, the method comprises operating the inter-engaging means to provide inter-engagement between the two rotors to transmit rotary power therebetween.

16. A method according to claim 15, wherein, in a further mode of operation, the method is as in the other mode, and the first and/or second electrical machine is operated as a motor to drive the at least one driveshaft.

17. Electronic processing apparatus programmed and operable to carry out a method according to claim 13.

18. A computer program comprising code portions which when executed by an electronic processing apparatus cause that apparatus to carry out a method according to claim 13.

19. A record carrier carrying thereon or therein a record of a program according to claim 18.

* * * * *